United States Patent
Negiz et al.

(10) Patent No.: US 9,145,522 B2
(45) Date of Patent: Sep. 29, 2015

(54) ENHANCED AROMATICS PRODUCTION BY LOW PRESSURE END POINT REDUCTION AND SELECTIVE HYDROGENATION AND HYDRODEALKYLATION

(71) Applicant: UOP LLC, Des Plaines, IL (US)

(72) Inventors: Antoine Negiz, Wilmette, IL (US); Manuela Serban, Glenview, IL (US); Kurt M. Vanden Bussche, Lake in the Hills, IL (US); Mark D. Moser, Elk Grove Village, IL (US); David A. Wegerer, Lisle, IL (US); Nicholas M. Brom, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 341 days.

(21) Appl. No.: 13/682,973

(22) Filed: Nov. 21, 2012

(65) Prior Publication Data

US 2013/0165719 A1     Jun. 27, 2013

Related U.S. Application Data

(60) Provisional application No. 61/578,982, filed on Dec. 22, 2011.

(51) Int. Cl.
| | |
|---|---|
| *C10G 59/02* | (2006.01) |
| *B01J 29/076* | (2006.01) |
| *C10G 63/04* | (2006.01) |
| *B01J 29/064* | (2006.01) |

(52) U.S. Cl.
CPC ............... *C10G 59/02* (2013.01); *B01J 29/064* (2013.01); *B01J 29/076* (2013.01); *C10G 63/04* (2013.01); *B01J 2229/42* (2013.01)

(58) Field of Classification Search
CPC ....... C10G 59/02; C10G 63/04; B01J 29/064; B01J 29/076; B01J 2229/42
USPC .......................................... 585/319
See application file for complete search history.

(56) References Cited

U.S. PATENT DOCUMENTS

| | | | | |
|---|---|---|---|---|
| 3,625,879 | A | * | 12/1971 | Horne et al. .................. 585/251 |
| 4,158,025 | A | | 6/1979 | Addison |
| 5,763,720 | A | | 6/1998 | Buchanan et al. |
| 5,763,721 | A | | 6/1998 | Wu et al. |
| 5,849,969 | A | | 12/1998 | Heyse et al. |
| 5,865,986 | A | * | 2/1999 | Buchanan et al. .............. 208/65 |
| 5,942,651 | A | | 8/1999 | Beech, Jr. et al. |
| 6,063,975 | A | | 5/2000 | Drake et al. |
| 2009/0023968 | A1 | * | 1/2009 | Wang et al. .................... 585/323 |

FOREIGN PATENT DOCUMENTS

EP          0138617 B2      1/1989

OTHER PUBLICATIONS

Meyers, Handbook of Petroleum Refining Processes, 2004, Third Edition, McGraw-Hill, Part 4, "UOP Platforming Process".

* cited by examiner

*Primary Examiner* — Randy Boyer
*Assistant Examiner* — Juan Valencia (57) ABSTRACT

A reforming process includes an endpoint reduction zone for converting $C_{11+}$ components via selective hydrogenation and hydrodealkylation to lower boiling point aromatics, such as benzene, toluene, and xylene, or their single ring aromatic $C_9$-$C_{10}$ precursors.

17 Claims, 7 Drawing Sheets

ENHANCED AROMATICS PRODUCTION BY LOW PRESSURE END POINT REDUCTION AND SELECTIVE HYDROGENATION AND HYDRODEALKYLATION

CROSS-REFERENCE TO RELATED APPLICATION

This application claims the benefit of U.S. Provisional Application No. 61/578,982 filed on Dec. 22, 2011.

FIELD OF THE INVENTION

The present invention relates generally to the reforming process, and more particularly to a low pressure process and catalyst formulation for converting the $C_{11+}$ portion of the reformate into useful benzene, toluene, and xylene components or their single ring aromatic $C_9$ to $C_{10}$ precursors.

Processes and apparatus for the catalytic reforming process are disclosed, for instance, in Robert A. Meyers, Handbook of Petroleum Refining Processes, Third Edition, McGraw-Hill, 2003, Part 4. Light petroleum distillate (naphtha) is contacted with a catalyst at elevated temperature and pressure to produce a high-octane liquid product that is rich in aromatic compounds.

Reforming technology employs multiple reactors that typically contain a single type of catalyst which has mainly a dehydrogenation component and an acid component. The $C_{10}$ polycyclic and $C_{11+}$ aromatic production from a given naphtha is almost complete in the first reactor. If these species continue downstream, they cause coke formation and deactivate the catalysts in the downstream reactors. The $C_{11+}$ component of the reformate is not considered a useful feedstock for the production of benzene, toluene, and xylene (BTX).

U.S. Pat. No. 5,763,720 discusses a transalkylation process to convert a heavy aromatic feed into lighter aromatics products, such as benzene, toluene, and xylene, by contacting a $C_{9+}$ aromatics fraction and benzene and/or toluene over a catalyst comprising a zeolite, such as ZSM-12, and a hydrogenation component.

U.S. Pat. No. 5,763,721 teaches a process for hydrodealkylating a $C_{9+}$ aromatic compound to a $C_6$ to $C_8$ aromatic hydrocarbon.

U.S. Pat. No. 5,942,651 describes a transalkylation process for converting a heavy aromatics feed to lighter aromatic products, such as benzene and xylene, by reacting $C_{9+}$ aromatic hydrocarbons and toluene and benzene under transalkylation reaction conditions over first and second catalyst compositions.

EP 0 138 617 B2 discusses a hydrodealkylation and isomerization process to convert alkyl-substituted aromatic compounds using a catalyst formed from a zeolite.

SUMMARY OF THE INVENTION

The present invention discloses a process and catalyst formulation for converting $C_{11+}$ components to benzene, toluene, and xylene or their single ring aromatic $C_9$ to $C_{10}$ precursors.

One aspect of the invention is a reforming process. In one embodiment, the process includes reacting a naphtha feed stream in a first reforming zone under reforming conditions to produce a first reforming zone product stream; and reacting the first reforming zone product stream in an endpoint reduction zone under endpoint reduction conditions to produce a product stream having a reduced endpoint compared to an endpoint of the first reforming zone product stream.

Another aspect of the invention is an endpoint reduction catalyst. In one embodiment, the catalyst includes: 0 to about 75% by weight of catalyst of a binder; about 1 to about 20% by weight of catalyst of molybdenum modified with sulfur; about 5 to about 70% by weight of catalyst of a zeolite having a 10 member ring or less; and 0 to about 60% by weight of catalyst of a zeolite having a 12 member ring by weight of catalyst.

DETAILED DESCRIPTION OF THE INVENTION

It would be beneficial to convert the $C_{11+}$ portion of the reformate into useful BTX components or their single ring aromatic $C_9$ to $C_{10}$ precursors in a reformer.

The goal of the present invention is to reduce the endpoint of the reforming zone product by dealkylating single ring components in the reformate, and saturating and cracking polynuclear aromatic (PNA) components. Reducing the amount of these heavy components in the reformate reduces or prevents coke formation in the downstream reactors. The conversion of the long chains and PNA compounds reduces the endpoint of the product stream of the endpoint reduction and dealkylation (EPR/DEA) section of the reformer.

The present invention involves a reforming process with an EPR/DEA zone. The EPR/DEA section operates at low pressure to convert the $C_{11+}$ components by selective hydrogenation and hydrodealkylization to lower boiling point aromatics such as BTX components or their $C_9$ to $C_{10}$ precursors. This results in a product which has a lower endpoint than the endpoint of the stream entering the EPR/DEA zone. For example, the endpoint, defined as the 99.5% level in a simulated distillation test, such as ASTM D-2887, can be reduced at least about 20° C., or at least about 25° C., or at least about 30° C., or at least about 35° C., or at least about 40° C.

The recovery of methyl groups and aromatic rings in the EPR/DEA zone is at least about 95%, or at least about 98%, or at least about 99%.

The EPR/DEA zone can allow one or more of the following conversions. The $C_{11+}$ aromatic conversion across the EPR/DEA zone is at least about 25%. The EPR/DEA zone very effectively dealkylates ethyl, propyl, and higher carbon number alkyl groups that are typically present in the $C_{8+}$ range aromatics. The EPR/DEA zone provides an ethyl group dealkylation function in the $C_9$ aromatic range that is characterized by converting at least about 80% of the methylethylbenzene, or at least about 85%, or at least about 90%. At least about 80% of methylpropyl benzene, diethyl benzene, and butyl benzene is dealkylated in the EPR/DEA zone. At least about 50% of the dimethylethylbenzene is dealkylated in the EPR/DEA zone. The conversion of $C_5$-$C_{12+}$ alkylated benzenes excluding pentamethyl benzenes, $C_5$ to $C_{10+}$ alkylated naphthalenes, $C_4$ to $C_{5+}$ alkylated phenantrenes, and $C_4$ to $C_{5+}$ alkylated anthracenes in the EPR/DEA zone is at least about 35%, or at least about 40%. The conversion of naphthalene is at least about 10%. Less than about 2% of the $C_6$-$C_8$ non-aromatic range are converted in the EPR/DEA zone.

Figure 1:
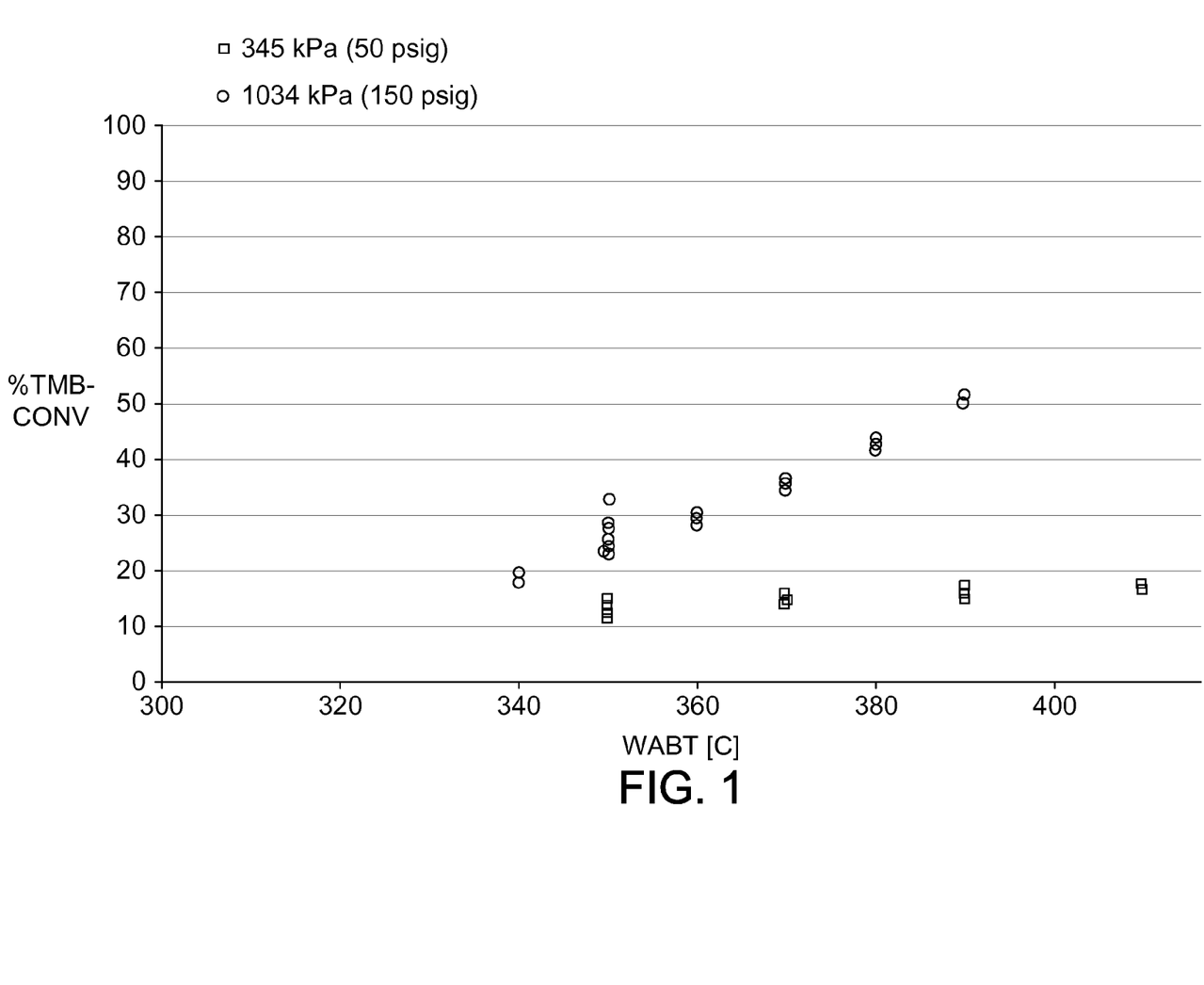
FIG. 1 is a graph showing the % trimethylbenzene conversion at 345 KPa (50 psig) and 1034 KPa (150 psig).
Figure 2:
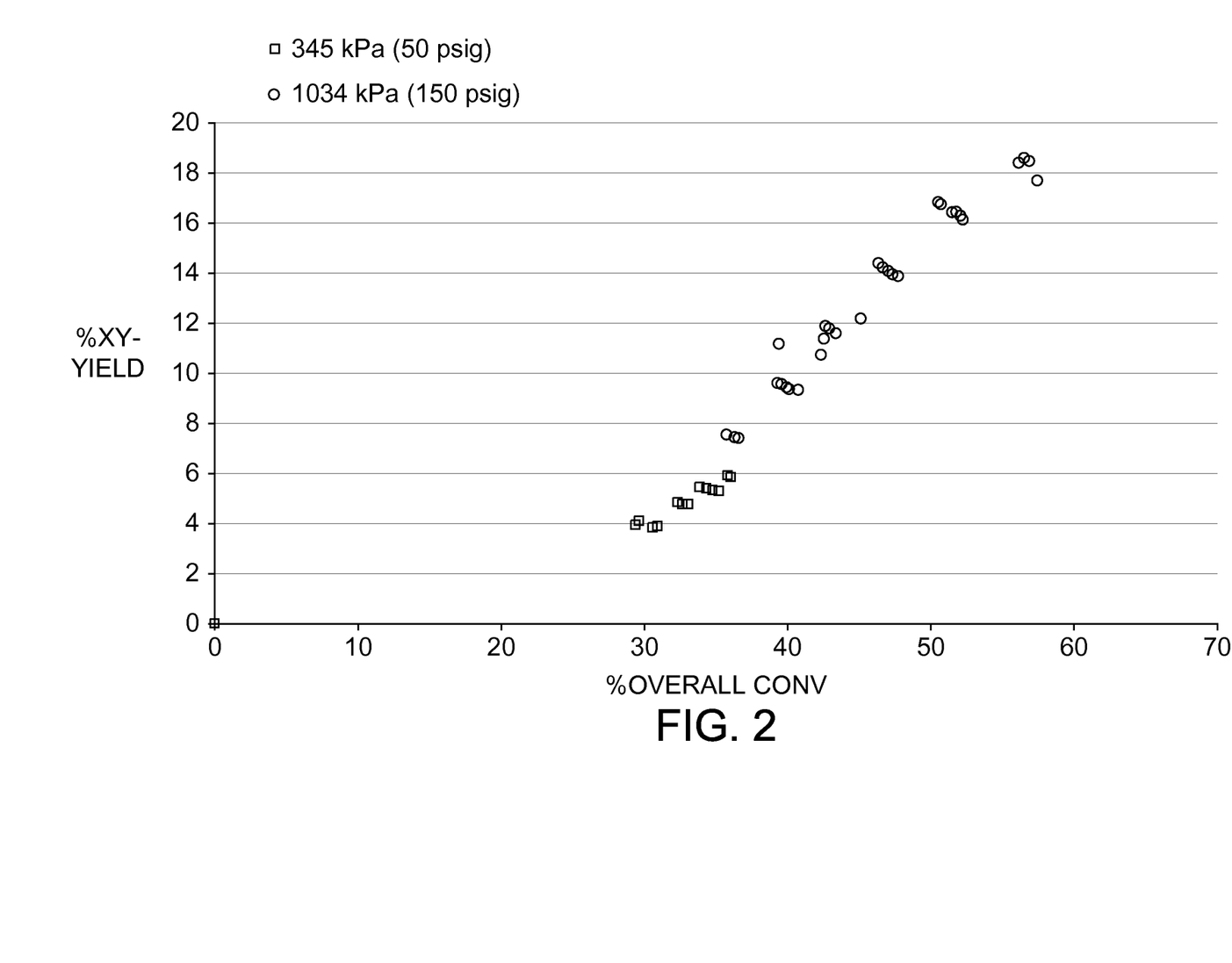
FIG. 2 is a graph showing the % Xylene Yield at 345 KPa (50 psig) and 1034 KPa (150 psig).

Furthermore, only a low level of transalkylation occurs in the EPR/DEA zone, for example, less than 35% conversion of trimethylbenzene (TMB) for a feed of 25% benzene and 75% $C_{9+}$ aromatics, as shown in FIG. 1. In addition, FIG. 2 shows low xylene yield at low pressure for the same composition. The xylene yields are much higher at 1034 KPa (150 psig) compared to 345 KPa (50 psig), consistent with the transalkylation reaction occurring better at higher pressures than low pressure.

Figure 3:
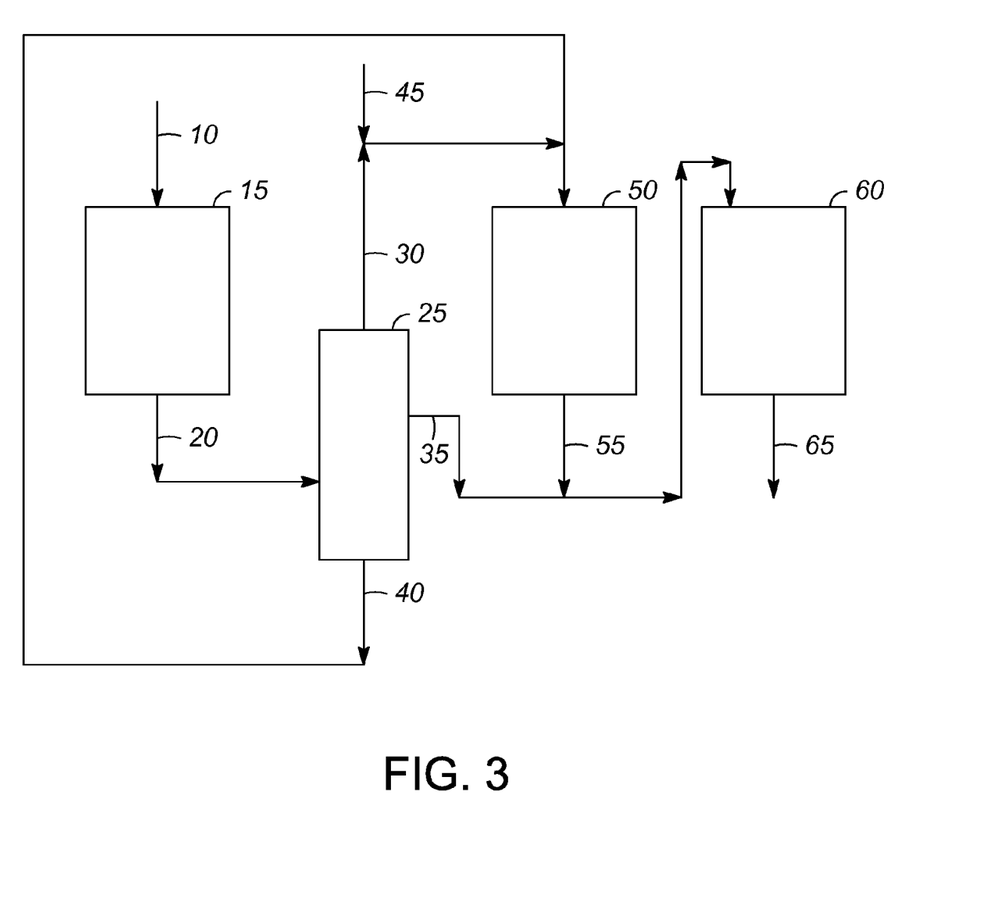
FIG. 3 is an illustration of one embodiment of a reforming process according to the present invention.

FIG. 3 illustrates one embodiment of a reforming process including an EPR/DEA zone. A naphtha stream 10 enters reforming zone 15. Reforming zone 15 operates under typical reforming conditions in the presence of a typical reforming catalyst and produces a reforming zone product stream 20. Reforming zones can further include more than one reactor vessel that contains typical reforming catalyst. These reactors can further be connected with and without additional separation equipment. The reforming zone 15 hence can generate at least one outlet stream. The reforming zone product stream 20 is sent to a separation zone 25 where one or more streams are generated. In this embodiment, separation zone 25 produces a first outlet stream 30, a second outlet stream 35, and a third outlet stream 40. Stream 30 contains hydrogen and $C_6$-hydrocarbons. Stream 35 is rich in $C_7$-$C_8$ aromatics, but also contains $C_7$-$C_8$ non-aromatics. Stream 40 is rich in $C_{9+}$ aromatics.

Stream 30 can optionally be mixed with additional benzene and/or toluene 45 and is sent to the EPR/DEA zone 50. Stream 40 is also sent to the EPR/DEA zone 50. Dealkylation and cracking/saturation take place in the EPR/DEA zone 50 producing a first outlet stream 55.

The first outlet stream 55 of the EPR/DEA zone 50 is mixed with the $C_7$-$C_8$ side stream 35 from the separation zone 25 and sent to the second reforming zone 60, where a second reforming reaction occurs. The first outlet stream 65 from the reforming zone 60 can then be recovered.

In another embodiment, the separation zone 25 produces at least three outlet streams. The first outlet stream is rich in hydrogen. The second outlet stream is rich in $C_6$-$C_7$ hydrocarbons, and the third outlet stream is rich in $C_{8+}$ aromatics. The third outlet stream and the first hydrogen rich stream are sent to the EPR/DEA zone 50. The second outlet stream can be sent to the second reforming zone.

Figure 4:
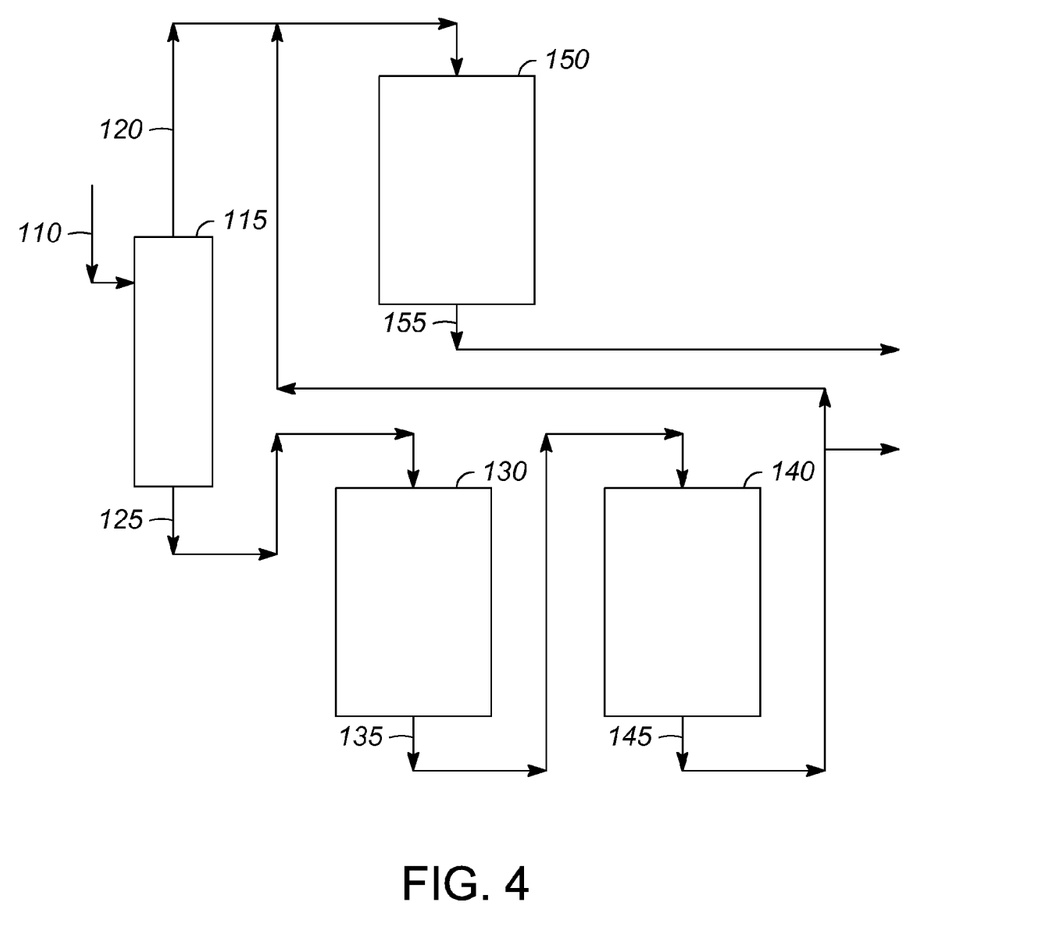
FIG. 4 is an illustration of another embodiment of a reforming process according to the present invention.

Another embodiment of the reforming process including an EPR/DEA zone is illustrated in FIG. 4. In this embodiment, the naphtha feed 110 is introduced into a separation zone 115 where at least two outlet streams are generated. The first outlet stream 120 is rich in $C_{8-}$. The second outlet stream 125 is rich in $C_{9+}$. The $C_{9+}$ stream 125 is sent to a reforming reactor 130 where it is reacted to form a $C_{9+}$ aromatics rich stream 135. The $C_{9+}$ aromatics rich stream 135 is then sent to the EPR/DEA zone 140 where the $C_{9+}$ aromatics are converted to a $C_{8-}$ aromatics stream 145. Optionally, a hydrogen rich stream can also be introduced to the inlet of the EPR/DEA zone 140.

The $C_{8-}$ stream 120 from the separation zone 115 is sent to a second reforming zone 150. All (or a portion) of the $C_{8-}$ aromatics stream 145 from the EPR/DEA zone 140 can be combined with the $C_{8-}$ overhead stream 120 and sent to the second reforming zone 150. The second reformate zone 150 can generate multiple outlet streams. The first outlet stream 155 would be rich in aromatics and several product streams from it can then be recovered, including hydrogen and $C_{5-}$ product.

Alternatively, all (or a portion) of the $C_{8-}$ aromatics stream 145 can be recovered instead of being sent to the second reforming zone 150.

Figure 5:
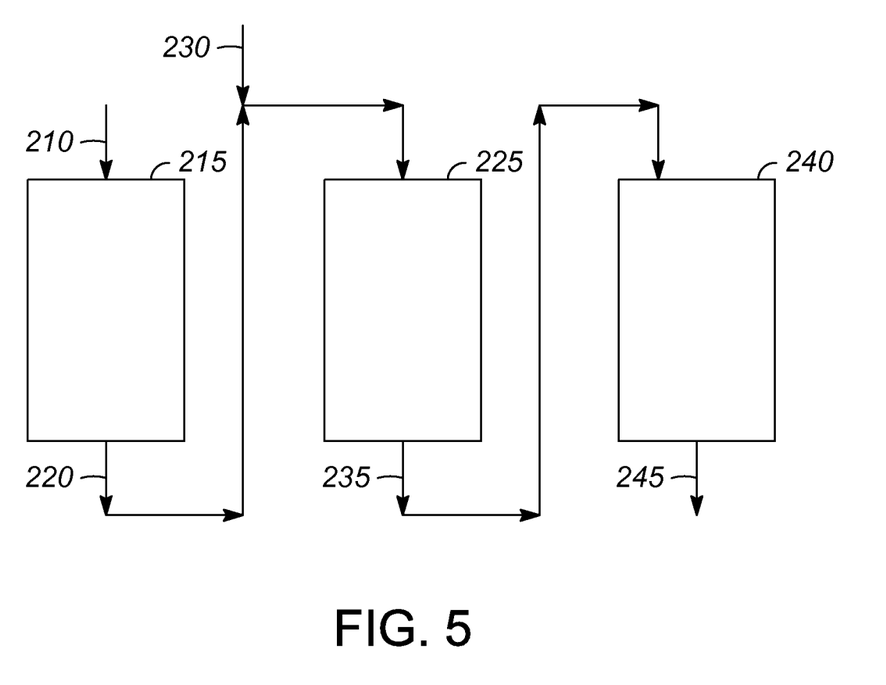
FIG. 5 is an illustration of another embodiment of a reforming process according to the present invention.

FIG. 5 illustrates another embodiment of the reforming process including an EPR/DEA zone. In this case, the naphtha feed 210 enters the reforming zone 215. At least one product stream 220 from the reforming zone 215 is sent to the EPR/DEA zone 225 along with an optional benzene and/or toluene stream 230. At least one product stream 235 from the EPR/DEA zone 225 is then sent to a second reforming zone 240. At least one product stream 245 from the second reforming zone 240 can then be recovered.

Figure 6:
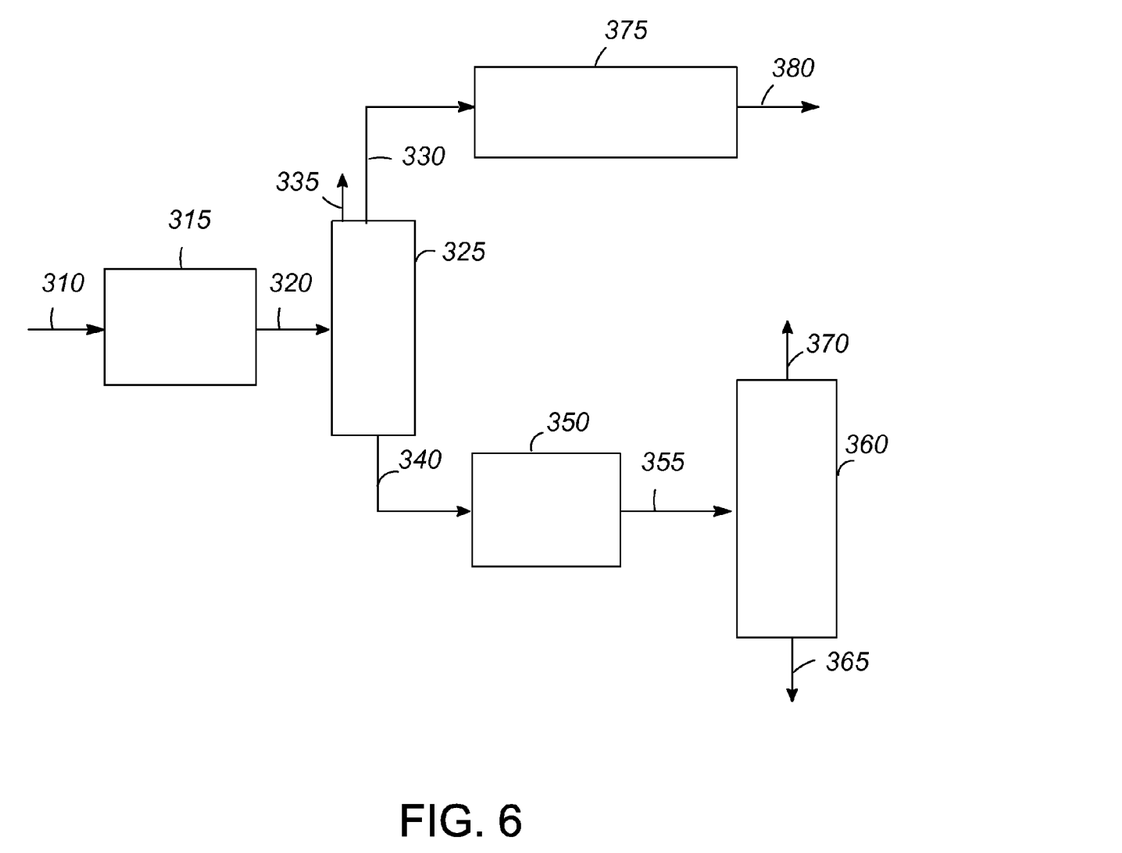
FIG. 6 is an illustration of an embodiment of a reforming process in combination with a portion of a process to produce aromatics according to the present invention.

FIG. 6 illustrates one embodiment of a reforming process in combination with a portion of a process to produce aromatics including an EPR/DEA zone. Many aromatics processes are known. A naphtha stream 310 enters reforming zone 315. Reforming zone 315 operates under typical reforming conditions in the presence of a typical reforming catalyst and produces a reforming zone product stream 320. Reforming zones can further include more than one reactor vessel that contains typical reforming catalyst. These reactors can further be connected with and without additional separation equipment. The reforming zone 315 hence can generate at least one outlet stream. The reforming zone product stream 320 is sent to a separation zone 325 where one or more streams are generated. In this embodiment, separation zone 325 produces a first outlet stream 330, a second outlet stream 335, and a third outlet stream 340. In a first embodiment one outlet stream may contain $C_{8+}$ hydrocarbons which may be rich in aromatics, in a second embodiment one outlet stream may contain $C_{7+}$ hydrocarbons which may be rich in aromatics, and in a third embodiment one outlet stream may contain $C_{9+}$ hydrocarbons which may be rich in aromatics.

In this embodiment, separation zone 325 may contain, for example, a debutanizer followed by a naphtha splitter column and therefore stream 335 may be overhead from the debutanizer and contains $C_4$ and lighter hydrocarbons and gases, 330 may be rich in $C_{6-}$ hydrocarbons, and stream 340 may be rich in $C_{7+}$ hydrocarbons. Alternatively, the naphtha splitter column of separation zone 325 may be operated so that outlet stream 340 may be rich in $C_{8+}$ hydrocarbons, or may be rich in $C_{9+}$ hydrocarbons.

Stream 330 can optionally directed to a unit in a process for producing aromatics such as extraction unit 375 to produce stream 380 rich in benzene. Stream 340 may be sent to the EPR/DEA zone 350. Dealkylation and cracking/saturation take place in the EPR/DEA zone 350 producing a first outlet stream 355. The first outlet stream 355 of the EPR/DEA zone 350 may be sent to the second separation zone 360, where at least two separated stream are generated, stream 370 and stream 365. In another embodiment at least a portion of one outlet stream, stream 350, from the EPR/DEA zone 350 is introduced into the separation zone 325, preferably before the debutanizer in zone 325. The separated streams 370 and or 365 may be recovered or may be further processed. In one embodiment, stream 370 is rich in toluene and stream 365 is rich in $C_{8+}$ hydrocarbons.

Figure 7:
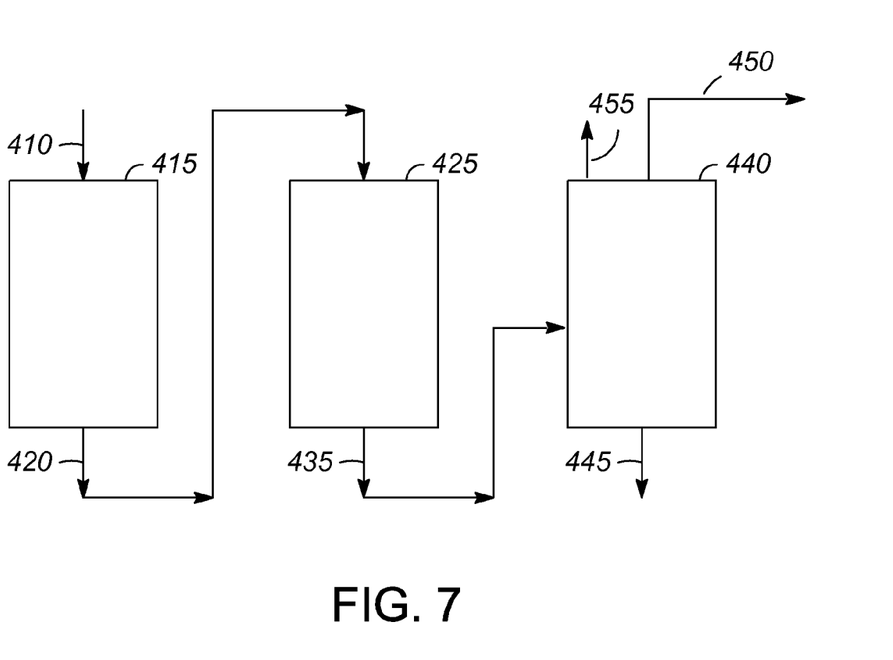
FIG. 7 is an illustration of an embodiment of a reforming process in combination with a portion of a process to produce aromatics according to the present invention.

FIG. 7 illustrates one embodiment of a reforming process in combination with a portion of a process to produce aromatics including an EPR/DEA zone. Many aromatics processes are known. A naphtha stream 410 enters reforming zone 415. Reforming zone 415 operates under typical reforming conditions in the presence of a typical reforming catalyst and produces a reforming zone product stream 420. Reforming zones can further include more than one reactor vessel that contains typical reforming catalyst. These reactors can further be connected with and without additional separation equipment. The reforming zone 415 hence can generate at least one outlet stream. The reforming zone product stream 420 is sent to the EPR/DEA zone 425. Dealkylation and cracking/saturation take place in the EPR/DEA zone 425 producing a first outlet stream 435. The first outlet stream 435 of the EPR/DEA zone 425 may be sent to separation zone 440 where one or more streams are generated. In this embodiment, separation zone 440 produces a first outlet stream 445, a second outlet stream 450, and a third outlet stream 455. In a first embodiment one outlet stream may contain $C_{8+}$ hydrocarbons which may be rich in aromatics, in a second embodiment one outlet stream may contain $C_{7+}$ hydrocarbons which may be rich in aromatics, and in a third embodiment one outlet stream may contain $C_{9+}$ hydrocarbons which may be rich in aromatics.

In this embodiment, separation zone 440 may contain, for example, a debutanizer followed by a naphtha splitter column and therefore stream 455 may be overhead from the debutanizer and contains $C_4$ and lighter hydrocarbons and gases, 450 may be rich in $C_{6-}$ hydrocarbons, and stream 445 may be rich in $C_{7+}$ hydrocarbons. Alternatively, the naphtha splitter column of separation zone 440 may be operated so that outlet stream 340 may be rich in $C_{8+}$ hydrocarbons, or may be rich in $C_{9+}$ hydrocarbons. Stream 450 may optionally directed to a unit in a process for producing aromatics such as, for example, an extraction unit to produce a stream rich in benzene (not shown). Stream 445 may optionally be directed to another separation zone for separation of specific aromatics and further processing. For example, xylenes may be separated from other aromatics and each of the separated streams may be further processed. Because reforming reactions do not take place efficiently at high pressure, reforming zones typically operate at pressures less than about 689 KPa (100 psig). Thus, it is desirable that any zones which are located in the reforming section also operate at pressures less than about 689 KPa (100 psig). It has been found that the EPR/DEA reactions take place at this pressure. The pressure in the EPR-DEA zone is generally less than about 689 KPa (100 psig), typically about 345 KPa (50 psig). As discussed above, FIG. 1 shows lower conversion of trimethylbenzene at 345 KPa (50 psig) than at 1034 KPa (150 psig), and FIG. 2 shows lower xylene yield. In the present invention, it is unnecessary for transalkylation to take place at this point in the system because there are downstream zones in which the transalkylation reactions desirably occur.

The EPR/DEA zone typically operates at a temperature in the range of about 250° C. (482° F.) to about 550° C. (1022° F.). The ratio of $H_2$ to HC is generally in the range of about 0.1 to about 8, typically about 2.0 to about 6.0. The weight hourly space velocity (WHSV) is generally in the range of about 0.1 to about 10 $hr^{-1}$, typically about 0.5 to about 4 $hr^{-1}$.

The catalyst includes at least one hydrogenation component and at least one alumino-silicate based acid component. It functions at low pressure and is capable of converting $C_{9+}$ aromatics, particularly $C_{11+}$ aromatics to useful benzene, toluene, and xylene components or their single ring aromatic $C_9$-$C_{10}$ precursors via selective hydrogenation and dehydroalkylation.

The catalyst for the EPR/DEA zone typically includes a suitable inorganic oxide component (refractory binder or matrix) to facilitate fabrication of the catalyst, provide strength and reduce fabrication costs. Suitable binders include, but are not limited to, inorganic oxides such as one or more of silica, alumina, magnesia, zirconia, chromia, titania, boria, thoria, aluminum phosphate, zinc oxide, and mixtures thereof. The preferred inorganic oxide binders include alumina, especially transition and gamma aluminas. Particularly useful aluminas are commercially available under the trade names CATAPAL B and VERSAL 250. The binder is typically present in an amount of 0 to about 75 wt % (all references are to wt % of the total catalyst), or 0 to about 70 wt %, or 0 to about 60 wt %, or 0 to about 50%, or 0 wt % to about 40 wt %, or 0 wt % to about 30 wt %, or about 5 wt % to about 75 wt % or about 5 wt % to about 70 wt %, or about 5 wt % to about 60 wt %, or about 5 wt % to about 50%, or about 5 wt % to about 40 wt %, or about 5 wt % to about 30 wt %, or about 10 wt % to about 75 wt % or about 10 wt % to about 70 wt %, or about 10 wt % to about 60 wt %, or about 10 wt % to about 50%, or about 10 wt % to about 40 wt %, or about 10 wt % to about 30 wt %, or about 10 wt % to about 25 wt %.

The catalyst composition includes a zeolite having a 10-member ring or less. Suitable zeolites include, but are not limited to, AEL, ITH, ITW, MEL, FER, TON, MFS, MFI, EUO, MTT, HEU, CHA, ERI, MWW, and LTA. Preferably, the 10-member ring zeolite is MFI. The zeolite having a 10 member ring or less is typically present in an amount of about 5 wt % to about 95 wt %, or about 5 wt % to about 90 wt %, or about 5 wt % to about 85 wt %, or about 5 wt % to about 80 wt %, or about 5 wt % to about 75 wt %, or about 5 wt % to about 70 wt %, or about 5 wt % to about 60 wt %, or about 5 wt % to about 50 wt %, or about 5 wt % to about 40 wt %, or about 5 wt % to about 30 wt %, or about 10 wt % to about 95 wt %, or about 10 wt % to about 90 wt %, or about 10 wt % to about 85 wt %, or about 10 wt % to about 80 wt %, or about 10 wt % to about 75 wt %, or about 10 wt % to about 70 wt %, or about 10 wt % to about 60 wt %, or about 10 wt % to about 50 wt %, or about 10 wt % to about 40 wt %, or about 15 wt % to about 95 wt %, or about 15 wt % to about 90 wt %, or about 15 wt % to about 85 wt %, or about 15 wt % to about 80 wt %, or about 15 wt % to about 75 wt %, or about 15 wt % to about 70 wt %, or about 15 wt % to about 60 wt %, or about 15 wt % to about 50 wt %, or about 15 wt % to about 40 wt %, about 20 wt % to about 95 wt %, or about 20 wt % to about 90 wt %, or about 20 wt % to about 85 wt %, or about 20 wt % to about 80 wt %, or about 20 wt % to about 75 wt %, or about 20 wt % to about 70 wt %, or about 20 wt % to about 60 wt %, or about 20 wt % to about 50 wt %, or about 20 wt % to about 40 wt %.

The catalyst can also include a zeolite having a 12-member ring, if desired. Suitable zeolites include, but are not limited to, BEA, MTW, FAU (including zeolite Y in both cubic and hexagonal forms, and zeolite X), MOR, LTL, IWW. Preferably, the 12-member ring zeolite can be MOR. The zeolite having the 12-member ring can be present in amount of 0 to about 60 wt %, or 0 to about 55 wt %, or 0 to about 50 wt %, or about 5 wt % to about 60 wt %, or about 5 wt % to about 55 wt %, or about 5 wt % to about 50 wt %, or about 10 wt %, to about 60 wt %, or about 10 wt % to about 55 wt %, or about 10 wt % to about 50 wt %, or about 15 wt % to about 60 wt %, or about 15 wt % to about 55 wt %, or about 15 wt % to about 50 wt %, or about 20 wt % to about 60 wt %, or about 20 wt % to about 55 wt %, or about 20 wt % to about 50 wt %, or about 25 wt % to about 60 wt %, or about 25 wt % to about 55 wt %, or about 25 wt % to about 50 wt %.

The catalyst typically also includes at least one metal having hydrogenation functionality. Metals having hydrogenation functionality include, but are not limited to, IUPAC Groups 6-10. Suitable metals include, but are not limited to molybdenum, cobalt, nickel, tungsten, rhenium, platinum, palladium, iron, and combinations thereof. The metal having hydrogenation functionality is typically present in an amount of 0 to about 30 wt %, or 0 to about 25 wt %, or 0 to about 20 wt %, or 0 to about 15 wt %, or about 0.5 wt % to about 30 wt %, or about 0.5 wt % to about 25 wt %, or about 0.5 wt % to about 20 wt %, or about 0.5 wt % to about 15 wt %, or about 1 wt % to about 30 wt %, or about 1 wt % to about 25 wt %, or about 1 wt % to about 20 wt %, or about 1 wt % to about 15 wt %, or about 1 wt % to about 10 wt %.

The metal can optionally include one or more promoters or modifiers. Suitable promoters or modifiers include, but are not limited to, IUPAC Groups 5-17. Suitable promoters or modifiers include, but are not limited to, gold, silver, copper, phosphorus, sulfur, tin, germanium, and lead.

The catalyst can optionally include one or more second modifiers on the metal, the binder, or both. Suitable second modifiers include, but are not limited to, IUPAC Groups 1-5, the lanthanides, and the actinides. Suitable second modifiers include, but are not limited to, lithium, sodium, potassium, magnesium, zirconium, and titanium.

Example 1

A reformate having the composition shown in Table 1 was introduced into a EPR/DEA zone with an average bed temperature of 370° C. (698° F.), a pressure of 358 KPa (52 psig), a H$_2$:HC ratio of 7.0, and a WHSV of 0.84 hr$^{-1}$. A summary of the product streams in weight % at three successive hourly on-line GC measurements from the EPR/DEA zone is shown in Table 1. Table 2 shows the GC by GC heavy component breakdown for the feed and the product distribution obtained in the second product column. Tables 1 and 2 were obtained using the method described in ASTM/UOP 990-11.

TABLE 1

| wt % Product | FEED | PRODUCT | PRODUCT | PRODUCT |
|---|---|---|---|---|
| C1 | 0.00 | 0.18 | 0.18 | 0.19 |
| C2 | 0.00 | 10.25 | 11.39 | 11.61 |
| C3 | 0.00 | 5.35 | 5.17 | 5.67 |
| n-C4 | 0.00 | 0.68 | 0.67 | 0.62 |
| i-C4 | 0.00 | 0.61 | 0.69 | 0.62 |
| n-C5 | 0.00 | 0.00 | 0.00 | 0.00 |
| i-C5 | 0.00 | 0.12 | 0.36 | 0.27 |
| C1-C5 non-A | 0.00 | 17.20 | 18.47 | 18.99 |
| C6-C8 non-A | 0.00 | 0.00 | 0.00 | 0.00 |
| Benzene | 0.11 | 5.20 | 5.28 | 5.05 |
| Toluene | 0.03 | 19.36 | 18.49 | 18.51 |
| Ethylbenzene | 0.00 | 0.08 | 0.08 | 0.07 |
| Xylene | 0.08 | 13.32 | 13.35 | 13.38 |
| C9A | 55.00 | 26.59 | 26.37 | 26.08 |
| C10A | 16.90 | 6.05 | 5.97 | 5.91 |
| C11+ | 27.87 | 12.20 | 11.99 | 12.01 |
| Styrene | 0.00 | 0.00 | 0.00 | 0.00 |
| TOTAL | 100 | 100 | 100 | 100 |

TABLE 2

| GCxGC Distribution of Naphthalene, MethylIndane C11+ Aromatics | Naphthalene, MethylIndane C11+ Aromatics FEED | Naphthalene, MethylIndane C11+ Aromatics PRODUCT | % Conversion |
|---|---|---|---|
| 2-phenyl-3-methylbutane | 0.00 | 0.00 | 100.00 |
| 1-methyl-3-tert-butylbenzene | 0.00 | 0.00 | |
| 3-phenyl-pentane | 0.00 | 0.00 | 100.00 |
| 1,3-dimethyl-5-iso-propylBenzene + 1-methyl-3-sec-butylBenzene + 2-phenylpentane | 0.52 | 0.00 | 100.00 |
| 1-methyl-2-iso-ButylBenzene + 1methyl-4-sec-ButylBenzene | 0.14 | 0.00 | 100.00 |
| 1,4-dimethyl-2-iso-PropylBenzene + 1-methyl-4-iso-ButylBenzene + 1-phenyl-2methylbutane | 0.31 | 0.00 | 100.00 |
| Isopentylbenzene | 0.01 | 0.00 | 100.00 |
| 1,2-dimethyl-4-isopropylbenzene | 0.03 | 0.00 | 100.00 |
| 1-methyl-2-tert-butylbenzene | 0.03 | 0.00 | 100.00 |
| 1,3-dimethyl-5-n-propylbenzene | 0.33 | 0.00 | 100.00 |
| 1,2-dimethyl-3-iso-PropylBenzene + 1-methyl-3,4-diethylBenzene + 1,4-dimethyl-2-n-propylbenzene | 1.12 | 0.08 | 92.75 |
| 1-methyl-3-n-butylbenzene | 0.25 | 0.00 | 100.00 |
| 1-methyl-2,4-diethylbz + n-pentylBenzene + 1-methyl-4-n-ButylBenzene | 0.18 | 0.02 | 91.44 |
| 1,3-dimethyl-4-n-PropylBenzene + 1-methyl-2,3-diethylBenzene | 0.52 | 0.04 | 93.14 |
| 1,3-dimethyl-2-n-PropylBenzene + 1-methyl-2,5-dietthylBenzene | 0.57 | 0.04 | 93.73 |
| 1-methyl-2,6-diethylbenzene | 0.01 | 0.00 | 86.81 |
| 1,2-dimethyl-4-n-propylbenzene | 0.56 | 0.01 | 98.32 |
| 1,3,5-trimethyl-2-ethylbenzene | 0.12 | 0.04 | 64.50 |
| 1,2-dimethyl-3-n-propylbenzene | 0.09 | 0.00 | 98.31 |
| 1,2,4-trimethyl-5-ethylBenzene + 1,2,4-trime-6-ethylBenzene | 1.05 | 0.38 | 64.28 |
| 1,2,3-trimethyl-5-ethylbenzene | 0.43 | 0.13 | 70.33 |
| 1,2,4-trimethyl-3-ethylbenzene | 0.05 | 0.02 | 58.36 |
| 1,2,3-trimethyl-4-ethylbenzene | 0.11 | 0.03 | 70.69 |
| Pentamethylbenzene | 0.37 | 0.29 | 23.14 |
| other C5 alkylbenzenes | 0.00 | 0.00 | 100.00 |
| C6-alkylbenzenes | 0.61 | 0.03 | 94.85 |
| C7-alkylbenzenes | 0.08 | 0.00 | 100.00 |
| C8-alkylbenzenes | 0.02 | 0.00 | 100.00 |

TABLE 2-continued

| GCxGC Distribution of Naphthalene, MethylIndane C11+ Aromatics | Naphthalene, MethylIndane C11+ Aromatics FEED | Naphthalene, MethylIndane C11+ Aromatics PRODUCT | % Conversion |
|---|---|---|---|
| C9-alkylbenzenes | 0.01 | 0.00 | 100.00 |
| C10-alkylbenzenes | 0.02 | 0.00 | 100.00 |
| C11-alkylbenzenes | 0.14 | 0.00 | 100.00 |
| C12-alkylbenzenes | 0.06 | 0.00 | 100.00 |
| 1-methylindane | 0.05 | 0.03 | 54.13 |
| 2-methylindane | 0.12 | 0.03 | 74.94 |
| 5-methylindan | 0.90 | 0.61 | 31.99 |
| 4-methylindan | 1.22 | 0.83 | 31.63 |
| Tetralin | 0.02 | 0.03 | 0.00 |
| C2-alkylindans and C1-alkytetralins | 0.85 | 0.77 | 9.70 |
| C3-alkylindans and C2-alkytetralins | 0.21 | 0.18 | 11.58 |
| C4-alkylindans and C3-alkytetralins | 0.05 | 0.02 | 57.00 |
| C5-alkylindans and C6-alkytetralins | 0.02 | 0.00 | 91.76 |
| C6-alkylindans and C7-alkytetralins | 0.01 | 0.00 | 100.00 |
| C7-alkylindans and C8-alkytetralins | 0.01 | 0.00 | 100.00 |
| C8-alkylindans and C9-alkytetralins | 0.02 | 0.00 | 100.00 |
| C1-indenes | 0.00 | 0.01 | 0.00 |
| C2-indenes | 0.00 | 0.01 | 0.00 |
| C3-indenes | 0.00 | 0.00 | 0.00 |
| other naphthenic substituted monoaromatics | 0.09 | 0.04 | 55.45 |
| Naphthalene | 3.37 | 0.88 | 74.03 |
| C1-alkylnaphthalenes | 3.81 | 2.10 | 44.81 |
| C2-alkylnaphthalenes | 1.96 | 2.53 | 0.00 |
| C3-alkylnaphthalenes | 0.93 | 1.02 | 0.00 |
| C4-alkylnaphthalenes | 0.51 | 0.22 | 55.94 |
| C5-alkylnaphthalenes | 0.53 | 0.00 | 99.12 |
| C6-alkylnaphthalenes | 1.34 | 0.00 | 99.65 |
| C7-alkylnaphthalenes | 0.97 | 0.00 | 99.84 |
| C8-alkylnaphthalenes | 0.37 | 0.00 | 100.00 |
| C9-alkylnaphthalenes | 0.11 | 0.00 | 100.00 |
| C10-alkylnaphthalenes | 0.01 | 0.00 | 100.00 |
| Biphenyl | 0.05 | 0.02 | 61.04 |
| C1-biphenyls | 0.18 | 0.12 | 31.46 |
| Acenaphthene | 0.01 | 0.01 | 17.58 |
| Fluorine | 0.02 | 0.01 | 56.04 |
| C1-alkylfluorenes | 0.08 | 0.06 | 22.07 |
| Dibenzofuran | 0.00 | 0.00 | |
| Methyldibenzofurans | 0.00 | 0.00 | |
| Dibenzothiophene | 0.00 | 0.00 | |
| C1-dibenzothiophenes | 0.00 | 0.00 | |
| C2-dibenzothiophenes | 0.00 | 0.00 | |
| Benzothiophene | 0.00 | 0.00 | |
| C1-benzothiophenes | 0.00 | 0.00 | |
| C2-benzothiophenes | 0.00 | 0.00 | |
| other diaromatics (biphenyls fluorenes etc) | 1.50 | 0.90 | 40.20 |
| phenanthrene and anthracene | 0.04 | 0.03 | 34.06 |
| C1-alkyphenanthrenes and C1-alkylanthracenes | 0.11 | 0.09 | 21.70 |
| C2-alkyphenanthrenes and C2-alkylanthracenes | 0.14 | 0.11 | 19.53 |
| C3-alkyphenanthrenes and C3-alkylanthracenes | 0.10 | 0.06 | 40.34 |
| C4-alkyphenanthrenes and C4-alkylanthracenes | 0.07 | 0.00 | 93.62 |
| C5-alkyphenanthrenes and C5-alkylanthracenes | 0.10 | 0.02 | 77.52 |
| Pyrene | 0.00 | 0.00 | 1.09 |
| C1-alkyl 4ring aromatics | 0.03 | 0.01 | 46.05 |
| C2-alkyl 4ring aromatics | 0.00 | 0.00 | |
| C3-alkyl 4ring aromatics | 0.08 | 0.05 | 34.06 |
| polar unknowns - mostly thiophenes and alkylstyrenes | 0.02 | 0.00 | 90.58 |
| polar unknowns | 0.09 | 0.05 | 47.25 |
| TOTAL | 100.00 | 100.00 | |

TABLE 3

|  | FEED | PRODUCT |
| --- | --- | --- |
| Simulated Distillation 99.5% FBP [C.] | 341.00 | 309.00 |
| Simulated Distillation 99.0% [C.] | 322.00 | 273.60 |
| Simulated Distillation 98.0% [C.] | 296.20 | 250.60 |

Table 3 provides the corresponding feed and product temperature cut points obtained via a gas chromatograph (GC) simulated based distillation technique at 99.5%, 99.0%, and 98.0% (ASTM D-2887). At 99.5%, the end point was reduced 32° C., at 99.0%, the reduction was 48.4° C., and at. 98.0%, it was 45.6° C.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A reforming process comprising:
reacting a naphtha feed stream in a first reforming zone under reforming conditions to produce a first reforming zone product stream; and
reacting at least a portion of the first reforming zone product stream in an endpoint reduction zone comprising an endpoint reduction catalyst comprising a binder and under endpoint reduction conditions including a pressure of less than about 689 KPa and a temperature between about 250° C. to about 370° C. to produce a product stream having a reduced endpoint compared to an endpoint of the first reforming zone product stream wherein at least about 80% of methylethylbenzene, methylpropyl benzene, diethyl benzene, and butyl benzene in the first reforming zone product stream is dealkylated in the endpoint reduction zone and at least about 50% of the dimethylethylbenzene in the first reforming zone product stream is dealkylated in the endpoint reduction zone.

2. The process of claim 1 wherein a conversion of $C_{11A+}$ aromatics in the endpoint reduction zone is at least about 25%.

3. The process of claim 1 wherein a conversion of $C_5$-$C_{12+}$ alkylated benzenes excluding pentamethyl benzenes, $C_5$ to $C_{10+}$ alkylated naphthalenes, $C_4$ to $C_{5+}$ alkylated phenantrenes, and $C_4$ to $C_{5+}$ alkylated anthracenes in the endpoint reduction zone is at least about 35%.

4. The process of claim 1 wherein recovery of methyl groups and aromatic rings in the endpoint reduction zone is at least about 95%.

5. The process of claim 1 further comprising separating the reduced endpoint stream into at least two portions.

6. The process of claim 1 wherein the reduced endpoint is at least about 20° C. less than the endpoint of the first reforming zone product stream.

7. The process of claim 1 wherein a conversion of trimethylbenzene is less than about 35%.

8. The process of claim 1 wherein first reforming zone product stream is reacted in the presence of an endpoint reduction catalyst comprising at least one zeolite having a 10 member ring or less and a metal having hydrogenation functionality.

9. The process of claim 1 wherein the endpoint reduction catalyst comprises:
5 to about 75% binder by weight of catalyst;
0 to about 30% metal with hydrogenation functionality by weight of catalyst, the metal with hydrogenation functionality being at least one element from Groups 6-10;
about 5 to about 95% zeolite having a 10 member ring or less by weight of catalyst; and
0 to about 60% zeolite having a 12 member ring by weight of catalyst.

10. The process of claim 9 wherein the metal with hydrogenation functionality has at least one first modifier from Groups 11-17.

11. The process of claim 9 wherein the metal with hydrogenation functionality is at least one of molybdenum, copper, nickel, tungsten, rhenium, platinum, palladium, or iron.

12. The process of claim 9 wherein the metal with hydrogenation functionality further comprises at least one promoter from Groups 5-16.

13. The process of claim 10 wherein first modifier is at least one of gold, silver, copper, phosphorus, sulfur, tin, germanium, or lead.

14. The process of claim 9 wherein the metal with hydrogenation functionality or the binder or both has at least one second modifier from Groups 1-5, lanthanides, or actinides.

15. The process of claim 14 wherein the second modifier is at least one of lithium, sodium, potassium, magnesium, zirconium, titanium, or combinations thereof.

16. The process of claim 1 further comprising contacting at least a portion of the reduced endpoint product stream with a second reforming catalyst in a second reforming zone under reforming conditions to form a second reformate stream.

17. A reforming process comprising:
reacting a naphtha feed stream in a first reforming zone under reforming conditions in the presence of a reforming catalyst to form a first reforming zone product stream comprising C8+ aromatic compounds;
reacting at least a portion of the first reforming zone product stream in an endpoint reduction zone under endpoint reduction conditions comprising a pressure of less than about 689 KPa and a temperature between about 250° C. to about 420° C. in the presence of an endpoint reduction catalyst comprising a binder and at least one zeolite having a 10 member ring or less and a metal having hydrogenation functionality to dealkylate aromatic compounds and crack and saturate polynuclear aromatic compounds to produce a stream having an endpoint at least about 20° C. less than an endpoint of the first reforming product stream, and wherein the conversion of trimethylbenzene is less than about 35%.

* * * * *